United States Patent
Sampsell et al.

(10) Patent No.: US 9,004,722 B2
(45) Date of Patent: Apr. 14, 2015

(54) LOW-PROFILE LED HEAT MANAGEMENT SYSTEM

(75) Inventors: Matthew B. Sampsell, San Jose, CA (US); Robert L. Holman, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 172 days.

(21) Appl. No.: 13/562,923

(22) Filed: Jul. 31, 2012

(65) Prior Publication Data
US 2014/0036516 A1    Feb. 6, 2014

(51) Int. Cl.
F21V 29/00    (2006.01)
F21V 29/02    (2006.01)
F21K 99/00    (2010.01)

(52) U.S. Cl.
CPC . F21V 29/02 (2013.01); F21K 9/52 (2013.01); F21K 9/30 (2013.01)

(58) Field of Classification Search
CPC ............... F21K 9/30; F21K 9/52; F21S 8/04; F21V 29/02; F21Y 2101/02; G02B 6/0021
USPC ................ 362/249.02, 294, 373, 555, 612
See application file for complete search history.

(56) References Cited

U.S. PATENT DOCUMENTS

| | | | |
|---|---|---|---|
| 7,198,386 B2 | 4/2007 | Zampini et al. | |
| 7,344,279 B2 | 3/2008 | Mueller et al. | |
| 7,866,850 B2 | 1/2011 | Alexander et al. | |
| 7,938,567 B2 | 5/2011 | Faber et al. | |
| 8,172,425 B2 * | 5/2012 | Wen et al. | 362/249.02 |
| 8,348,489 B2 | 1/2013 | Holman et al. | |
| 2004/0184272 A1 | 9/2004 | Wright et al. | |
| 2007/0045649 A1 * | 3/2007 | Chen | 257/99 |
| 2010/0254121 A1 | 10/2010 | Zhou | |
| 2010/0259919 A1 | 10/2010 | Khazi et al. | |
| 2011/0069502 A1 | 3/2011 | Hum | |
| 2011/0109216 A1 | 5/2011 | Kang et al. | |
| 2011/0170294 A1 | 7/2011 | Mier-Langner et al. | |
| 2011/0222284 A1 | 9/2011 | Kong et al. | |
| 2011/0267828 A1 | 11/2011 | Bazydola et al. | |
| 2012/0195039 A1 * | 8/2012 | Kong | 362/235 |

FOREIGN PATENT DOCUMENTS

| | | | |
|---|---|---|---|
| EP | 2423573 A2 | 2/2012 | |
| EP | 2455655 A2 | 5/2012 | |
| JP | 2012069395 A | 4/2012 | |
| JP | 2012123924 A | 6/2012 | |
| WO | WO-2009099547 A2 | 8/2009 | |
| WO | WO-2011060319 A1 | 5/2011 | |

OTHER PUBLICATIONS

International Search Report and Written Opinion—PCT/US2013/051709—ISA/EPO—Oct. 1, 2013.

\* cited by examiner

*Primary Examiner* — Stephen F Husar
(74) *Attorney, Agent, or Firm* — Knobbe, Martens, Olson & Bear LLP

(57) ABSTRACT

This disclosure provides systems, methods and apparatus for low-profile lighting systems. In one aspect, an LED-based light engine, which may be thinner and/or lighter than conventional light engines, may be retained in both conventionally-dimensioned and low-profile light fixtures. In another aspect, a light engine can include both convective and conductive heat transfer components, the efficacy of which will vary based on the dimensions of a light fixture in which the light engine is installed.

26 Claims, 11 Drawing Sheets

LOW-PROFILE LED HEAT MANAGEMENT SYSTEM

TECHNICAL FIELD

This disclosure relates to lighting elements and fixtures having integrated heat management components, particularly LED-based light engines.

DESCRIPTION OF THE RELATED TECHNOLOGY

Conventional lighting fixtures are designed to retain incandescent or fluorescent lighting, and are generally at least several inches deep and correspondingly bulky. Such conventional lighting fixtures may require significant amounts of overhead space when installed in a false ceiling or similar structure, particularly for fixture designed to retain large, high-output bulbs. Similarly, their weight may necessitate direct securement of the lighting fixture to a structural member other than a ceiling panel, such as a frame.

SUMMARY

The systems, methods and devices of the disclosure each have several innovative aspects, no single one of which is solely responsible for the desirable attributes disclosed herein.

One innovative aspect of the subject matter described in this disclosure can be implemented in a light engine, including a light-emitting diode (LED), a light guide in optical communication with the LED and having an output surface, where the light guide is configured to direct light from the LED through the output surface, a convective heat transfer component configured to provide a convective thermal path away from the LED, and a transfer surface configured to provide a conductive heat path away from the LED when the light engine is installed within a light fixture such that the transfer surface is configured to abut a portion of the light fixture.

In one aspect, the light engine can additionally include a thermal pad, where the transfer surface is a surface of the thermal pad. In a further aspect, the thermal pad can include a deformable material.

In one aspect, the light engine can additionally include contacts extending from a surface of the light engine, where the contacts are configured to provide electrical and mechanical connection with a light fixture. In a further aspect, the contacts can be disposed radially outward of at least a portion of the transfer surface. In a further aspect, an upper portion of the contacts can be positioned so as not to extend beyond an upper portion of the transfer surface. In a further aspect, the contacts can be disposed radially inward of at least a portion of the transfer surface. In a still further aspect, the transfer surface can include an annular surface.

In one aspect, the convective heat transfer component can include a plurality of thermal fins, rods, and/or pins disposed radially outward of at least a portion of the transfer surface. In one aspect, the convective heat transfer component can include a movable component configured to increase airflow adjacent the light fixture. In a further aspect, where the movable component can include one of a fan or a piezoelectric element.

Another innovative aspect of the subject matter described in this disclosure can be implemented in a light engine, including a light guide in optical communication with a light-emitting diode (LED) and having an output surface, where the light guide is configured to direct light from the LED through the output surface, a convective heat transfer component configured to provide a convective thermal path away from the LED, a transfer surface configured to provide a conductive thermal path away from the LED, and a plurality of contacts which provide electrical and mechanical connection with a light fixture, where the contacts further enable a conductive thermal connection by securing the transfer surface of the light engine against a complimentary transfer surface of the light fixture when the light engine is installed within the light fixture.

In one aspect, the transfer surface can include a surface of a deformable thermal pad, where the contacts maintain the thermal pad in a partially deformed state when the transfer surface of the light engine is secured against the transfer surface of the light fixture. In one aspect, the contacts can be disposed within a recessed portion of the light engine. In one aspect an upper portion of the contacts can be positioned so as not to extend beyond an upper portion of the transfer surface. In one aspect, the contacts can be disposed radially outward of at least a portion of the transfer surface.

Another innovative aspect of the subject matter described in this disclosure can be implemented in a light engine, including a light guide in optical communication with a light-emitting diode (LED) and having an output surface, where the light guide is configured to direct light from the LED through the output surface, means for providing a convective thermal path away from the LED, and means for providing a conductive thermal path away from the LED when the light engine is disposed within a light fixture such that the means for providing a conductive thermal path is configured to abut a portion of the light fixture.

In one aspect, the means for providing a convective thermal pathway can include a plurality of thermal fins disposed around a periphery of the light engine. In one aspect, the means for providing a conductive thermal path can include a transfer surface configured to abut a complimentary transfer surface of the light fixture. In a further aspect, the transfer surface can include a surface of a thermal pad.

Another innovative aspect of the subject matter described in this disclosure can be implemented in a method of installing a light engine into a light fixture, including providing an LED-based light engine, the light engine including a convective heat transfer component configured to provide a convective thermal path away from the light engine, a transfer surface, and a plurality of contacts extending from the light engine, engaging the plurality of contacts with a corresponding connection portion of a light fixture, and translating the light engine relative to the light fixture to form an electrical and mechanical connection with the light fixture, where translation of the light engine brings the transfer surface of the light engine into contact with a complementary transfer surface of the light fixture to form a thermal connection therebetween.

In one aspect, translating the light engine relative to the light fixture can include rotating the light engine relative to the light fixture.

Another innovative aspect of the subject matter described in this disclosure can be implemented in a light fixture, including a housing defining a receiving space dimensioned to retain a light engine therein, a transfer surface including a thermally conductive material, where the transfer surface is exposed to the receiving space, a connector portion configured to provide electrical and mechanical connection with the light engine, where the connector portion is configured to mechanically bias a portion of the light engine against the transfer surface to provide a conductive heat path from the light engine to the transfer surface.

In one aspect, the receiving space of the housing can have a depth of less than two inches, and a minimum height to width ratio of the light fixture can be less than or equal to 1:2. In one aspect, the receiving space of the housing can have a depth of less than or equal to one inch, and the minimum height to width ratio of the light fixture can be less than or equal to 1:4. In one aspect, the light fixture can additionally include at least one convective heat transfer component disposed on an outer surface of the housing.

Another innovative aspect of the subject matter described in this disclosure can be implemented in a method of fabricating a light engine, including providing a light-emitting diode (LED) in optical communication with a light guide, providing a convective heat transfer component in thermal communication with the LED, and providing a transfer surface in thermal communication with the LED and configured to provide a conductive heat path away from the LED when the light engine is installed within a light fixture such that the transfer surface is configured to abut a portion of the light fixture.

In one aspect, providing a convective heat transfer component in thermal communication with the LED can include providing a plurality of thermal fins, pins, and/or rods extending outward from a surface of the light engine. In one aspect, the method can additionally include providing at least one connector in electrical communication with the LED, where the connector is configured to provide mechanical and electrical connections between the LED and the light fixture.

Another innovative aspect of the subject matter described in this disclosure can be implemented in a method of fabricating a light fixture, including providing a housing, the housing defining a receiving space dimensioned to retain a light engine therein, providing a transfer surface including a thermally conductive material, where the transfer surface is exposed to the receiving space, and providing a connector portion configured to provide electrical and mechanical connection with the light engine, where the connector portion is configured to mechanically bias a portion of the light engine against the transfer surface to provide a conductive heat path from the light engine to the transfer surface.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
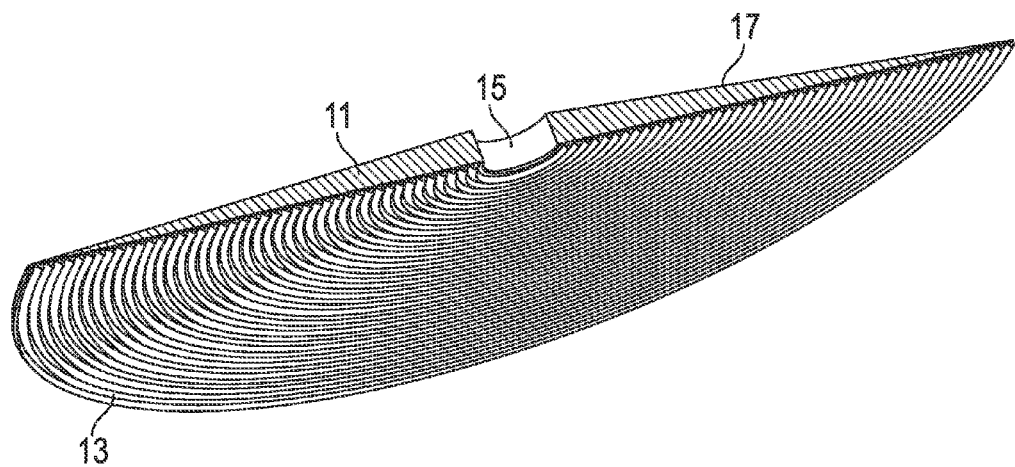
FIG. 1A is a cross-section perspective view of a circular light guide that can be used to receive light from one or more centrally located light emitting diodes (LEDs).

The following detailed description is directed to certain implementations for the purposes of describing the innovative aspects. However, the teachings herein can be applied in a multitude of different ways. While the teachings are applicable to thin LED-based light engines and light fixtures for retaining the same, and in particular LED-based light engines which include a light guide for directing the output of an LED-light source in a desired pattern, the teachings may also be applicable to any sufficiently light-weight and/or thin light engines or fixtures configured to retain the same. It is contemplated that the described implementations may be included in or associated with lighting used for a wide variety of applications such as, but not limited to: commercial, industrial, and residential lighting. Implementations may include but are not limited to lighting in homes, offices, manufacturing facilities, retail locations, hospitals and clinics, convention centers, cultural institutions, libraries, schools, government buildings, warehouses, military installations, research facilities, gymnasiums, sports arenas, or lighting in other types of environments or applications. In various implementations the lighting may be overhead lighting and may project downward a narrow spotlight or a spotlight having an area that is larger (for example, several times or many times larger) than an area of a light emitting surface of a lighting device. Thus, the teachings are not intended to be limited to the implementations depicted solely in the Figures, but instead have wide applicability as will be readily apparent to a person having ordinary skill in the art.

In some implementations, a lighting device or apparatus can include a light engine component and a connection portion for electrically and/or mechanically coupling the lighting device to a light fixture. As used herein, the term "light fixture" refers to any fixture or structure configured to be electrically and/or mechanically coupled to any portion of a lighting device, for example, a recessed light housing, a downlight fixture, a can fixture, a pot light fixture, a cove light fixture, a torch lamp fixture, a pendant light fixture, a sconce fixture, a track light fixture, and/or a bay light fixture, whether secured to a vertical surface such as a wall, a horizontal surface such as a ceiling, soffit, floor, table, or other structure.

Conventional light engines are generally dimensioned so as to require fixtures which are often as high as or higher than they are wide. For example, incandescent light bulbs are generally at least as tall as they are wide, requiring fixtures which are often several inches deep. Because the use of such fixtures is widespread, LED light engines have been designed to fit into such conventional lighting fixtures, and have been made taller than may be necessary, particularly for LED light engines employing light-shaping optics. Because there is ample space in such fixtures, these high-profile LED light engines utilize convective cooling features to transmit heat away from the LEDs. These convective cooling features may include thermal fins or similar convective heat transfer structures may be utilized to facilitate heat conduction away from the LED light engine, leveraging the additional clearance and associated airflow.

While LED light engines can be configured to work with these conventional fixtures, low-profile LED engines can be used which do not require fixtures which are as deep as conventional lighting fixtures. If the low-profile light fixtures are made sufficiently small, however, convective heat transfer from the LED light engine to the surrounding area may be constrained due to a lack of airflow over and around the LED light engine. By providing a conductive thermal path in addition to the convective cooling features, an LED light engine can be configured to efficiently conduct heat away in either a conductive or convective manner, and can be used in both conventional and low-profile light fixtures.

Particular implementations of the subject matter described in this disclosure can be implemented to realize one or more of the following potential advantages. By providing both conductive and convective heat transfer components, an LED light engine can be suitable for use in a wide variety of fixture shapes and depths. A single connection can provide not only mechanical and electrical connection, but also a thermal connection. When the connectors include features which bias the retained LED light engine against an interior surface of a fixture, the thermal connection can be made more reliable and efficient. Particular connector designs can provide this connection while minimizing the depth of the light fixture.

FIG. 1A is a cross-sectional perspective view of an implementation of a circular light guide 100. The circular light guide plate 11 has arranged over its rearward surface a faceted light-turning film 13. The thickness of the light guide plate 11 may decrease from the center towards the perimeter, creating a tapered profile. The light guide plate 11 also includes a central cylindrical surface 15 through which light can be injected into the light guide plate 11. Light entering the central boundary 15 propagates radially through the body of the light guide plate 11 by total internal reflection. In implementations where the light guide plate 11 is tapered, light guided in the light guide plate 11 will propagate by total internal reflection until it is ejected by the tapered light guide plate 11 at an oblique angle relative to the ejection surface, for example in the implementation of FIG. 1A, rearward surface 16. The obliquely ejected light can optionally interact with the light-turning film 13. In some implementations, the light ejected by the tapered light guide plate 11 can be a narrow beam having an angular width similar to the taper angle of the tapered pate 11. In some implementations, light-turning film 13 can turn the light so that the center of the output beam is substantially normal to the rearward surface 16, the forward surface 17, and/or the light guide plate 11. Alternatively, the light-turning film 13 can be configured to turn the light so that the center of the output beam is at any angle relative to the forward surface 17. In some implementations, the light-turning film 13 can have a metallized surface so as to reflect light emitted from the light guide plate 11 such that the light is turned and output from through light guide plate 11 and emitted from the forward surface 17.

Figure 1B:
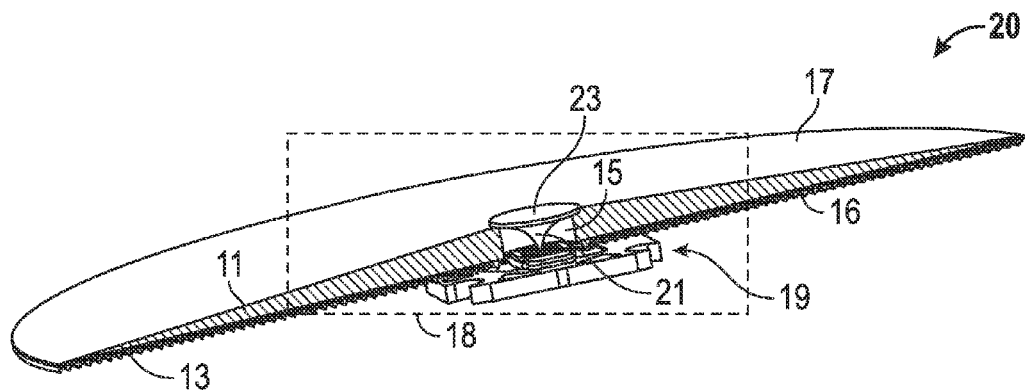
FIGS. 1B and 1C illustrate cross-section perspective views of an implementation of a light engine including the circular light guide of FIG. 1A.
Figure 1C:
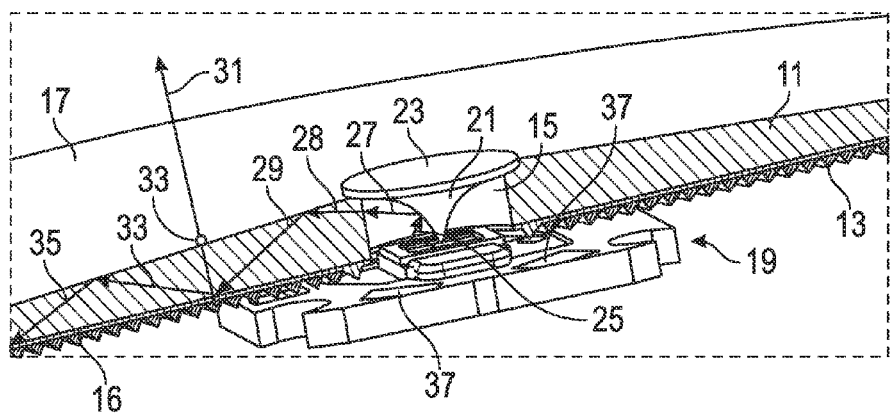

FIGS. 1B and 1C illustrate cross-sectional perspective views of an implementation of an LED emitter combined with the circular light guide plate 11 of FIG. 1A. FIG. 1C shows a magnified view 18 of the cross-section of FIG. 1B. As illustrated, an LED emitter assembly 19 and a radially symmetric reflector 21 are combined with the light guide plate 11 shown in FIG. 1A. Together this structure can comprise a light engine 20. The light emitter assembly 19 may include one or more light emitters such as light emitting diodes, which may be placed on a package (not separately shown) to facilitate thermal management of the heat generated by the light emitter assembly. The package may include a thermally conductive material which may be in contact with other thermal management components to provide a thermal path away from the light emitter assembly 19.

Light emitted from LED emitter assembly 19 reflects off the curved surface 21 of a radially symmetric reflector 23. In some implementations, an etendue-preserving reflector may be used to couple light from the LED emitter assembly 19 to the light guide plate 11. Light entering the light guide plate 11 propagates therein by total internal reflection between rearward surface 16 and forward surface 17, until it is ejected by the tapered light guide plate 11 at an oblique angle, in the illustrative implementation, relative to the rearward surface 16. Because a thin dielectric layer is disposed between the rearward surface 16 and the metallized light-turning film 13, and the forward surface 17 has an air interface, light will exit from the rearward surface 16 as the total internal reflection angle is larger (when measured from normal) at rearward surface 16 than forward surface 17. For example, light ray 25 shown in FIG. 1C is redirected from the reflector 23 as ray 27 towards the cylindrical surface 15 of the light guide plate 11. On entry, example ray 27 is shown as propagating ray 28, which is reflected off the forward surface 17 of the light guide plate 11 as ray 29 and redirected back towards the rearward surface 16. Light that strikes the surface rearward surface 16 at less than the critical angle passes through rearward surface 16 towards light-turning film 13 and is turned out. Remaining light continues to propagate within the light guide plate 11 by total internal reflection as rays 33 and 35. As illustrated in FIGS. 1A-1C, the light-turning film 13 is arranged under the rearward surface 16 of the light guide plate 11 and is reflective to direct the light out of the forward surface 17.

Figure 1D:
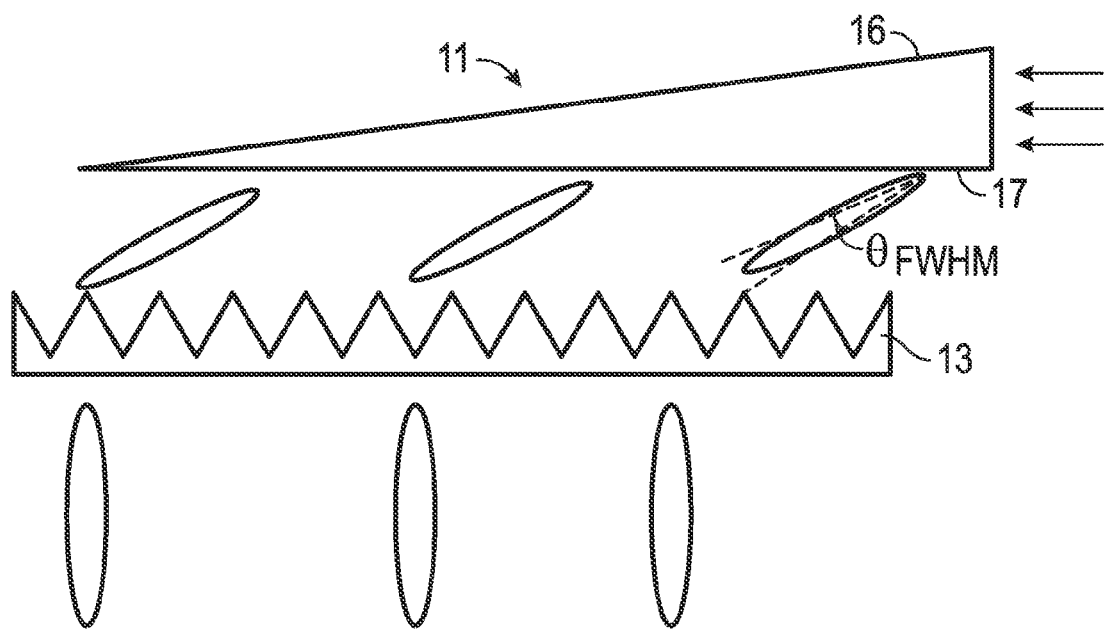
FIG. 1D illustrates an exploded schematic view of another implementation of a circular light guide plate with a light-turning film.

FIG. 1D illustrates an exploded schematic view of a cross section of another implementation of a circular light guide plate with a light-turning film. As illustrated, the light guide plate 11 is similar to that of FIGS. 1A-1C, but the light-turning film 13 is arranged over the forward surface 17 of the light guide plate 11 rather than the rearward surface. In this configuration, light enters the light guide 11 from the right side and propagates through the light guide plate 11 as described above. In some implementations, the rearward surface 16 can be metallized so as to prohibit light from being emitted through the rearward surface 16. Light propagates within light guide plate 11 until emitted from forward surface 17 at an oblique angle relative to the forward surface 17. Light emitted from forward surface 17 can interact with light-turning film 13. As illustrated, the light-turning film 13 turns the light such that it exits the light-turning film 13 substantially perpendicular to the light guide plate 11 and the forward surface 17 of the light guide plate 11. The light-turning film 13, in the illustrated implementation, does not substantially affect the angular beam width of the light, for example, the light-turning film 13 does not dramatically affect the full width at half maximum of the beam, $\theta_{FWHM}$. Rather, the light-turning film 13 redirects incident light from the circular light guide plate 13. The prism-like features of the light-turning film 13 need not be symmetric, and are shown as symmetric for illustrative purposes only. Although illustrated as turning light to be perpendicular to the forward surface 17, in other implementations the light-turning film 13 can be configured to turn the light at any angle relative to the forward surface 17. Moreover, the light-turning film 13 need not be uniform. For example, one portion may turn light at a first angle, with a second portion turning light at a second angle.

As shown, the light guide plate 11 is tapered such that its thickness decreases radially from the central portion to the peripheral portions. The tapering of the light guide plate 11 further assists light to be turned towards light-turning film 13, and output from the surface 17 of the light guide plate 11. In some implementations, the light guide plate 11 can be sloped from its central portion to its peripheral portions at an angle of about 5 degrees or less. In some implementations, the light guide plate 11 can be sloped at an angle between 1 to 15 degrees. In some implementations, the angle can range from 2 to 8 degrees. The slope of the light guide plate 11 can be related to the width of the light beam exiting the light guide plate 11. In some implementations where narrower beams are preferred, the light beam emitted from the forward surface 17 has a beam width, for example, $\theta_{FWHM}$=60 degrees or less, 45 degrees or less, 30 degrees or less, 15 degrees or less, 10 degrees or less, or 5 degrees or less. In other implementations where wider beams are preferred, including non-tapered light guide plate 11, the light beam emitted from the forward surface 17 has a beam width, for example, $\theta_{FWHM}$=120 degrees or less or 90 degrees or less. In some implementations where the slope of the light guide plate would be too large to be practical in order to achieve a desired output beam width, the light guide plate 11 may include one or more steps with regions of the light guide plate being sloped as desired rather than the whole light guide plate 11 having one continuous slope as illustrated. In some implementations, the light-turning film 13 or the light guide plate 11 and the light turning film 13 together can be configured to affect angular width of light distribution in addition to only turning the light without affecting the beam width. The configuration of light extraction features can assist in controlling the direction and distribution of light output from the light guide plate 11.

In some implementations, light emitted from LED emitter 19 can be evenly distributed across the surface of the light guide plate 11. Additionally, brightness of the source is decreased because the light is distributed across a larger area.

In some implementations, the reflector 23 can be replaced by other functionally similar coupling optics, including segmented reflectors, a lens, groups of lenses, a light pipe section, hologram, etc. As shown, the LED emitter(s) emits light in response to a DC operating voltage applied to terminals 37. In some implementations, the LED emitter assembly 19 may have a different form of light-emitting surface, such as a raised phosphor, raised clear encapsulent, etc.

Figure 1E:
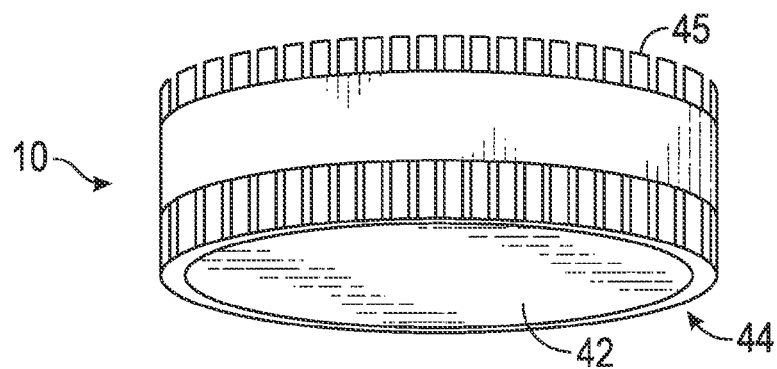
FIG. 1E shows a perspective view of a light engine incorporating a light guide such as the light guides illustrated in FIGS. 1A-1D.

FIG. 1E shows a perspective view of an example of a light engine incorporating a light guide such as the light guides illustrated in FIGS. 1A-1D. To assist in the description of the implementations described herein, the following coordinate terms are used, consistent with the coordinate axes illustrated in FIG. 1E. A "longitudinal axis" is generally orthogonal to the first side 44 of the light engine 10. A "radial axis" is any axis that is normal to the longitudinal axis. In addition, as used herein, "the longitudinal direction" refers to a direction substantially parallel to the longitudinal axis and "the radial direction" refers to a direction substantially parallel to a radial axis. As illustrated in FIG. 1E, the light engine 10 can have a front side 44 and a back side 46 (see FIG. 1F). The front side 44 can include a light emitting surface or aperture 42 configured to provide light to a space or volume.

As used herein, a light engine refers to any structure that includes at least one light emitter or light emitting element and optical structures associated with the at least one light emitter or light emitting element. For example, a light engine can include a light bulb including a filament light as a light emitter and a diffusive glass bulb surrounding the filament as an optical structure associated with the light emitter. Another example of a light engine can include a light-emitting diode ("LED") optically coupled to a light guide where the light guide includes means for ejecting light out of the light guide. In thin illumination light engines, the means for ejecting light can include a taper angle between surfaces of the light guide, thereby forming a tapered light guide, as discussed elsewhere herein. In some implementations, the means for ejecting light can include light ejecting facets and/or dot structures. Although illustrated in a particular implementation, the light engine 10 can also include other light engines capable of providing visible light, including, for example, an incandescent bulb, a fluorescent tube, another implementation of a light engine, or any other suitable source of light.

In some implementations, the light engine can include one or more optical conditioners disposed adjacent to the aperture 42 (FIG. 1E) through which light is emitted, and configured to provide various shapes and types of far-field lighting, for example, a spotlight, a widely spread beam, or a diffuse light, and shaped as circular, square, rectangular, or other shape. In some implementations, the light-turning film 13 of FIG. 1D can be considered an optical conditioner. In some implementations, the optical conditioner is a thin film including a lenticular lens having optical power which is configured to provide various beam shapes. In some implementations, a stack of optical films is placed in the aperture 42 of the light engine 10 that can include one or more of a lenticular film, lenslet array, or prismatic light-turning film. In some implementations, the light engine 10 can include one or more heat transfer structures configured to dissipate heat or thermal energy from an LED included in the light engine 10. For example, the light engine 10 can include one or more heat transfer fins 45 configured to dissipate heat from an LED of the light engine 10.

Figure 1F:
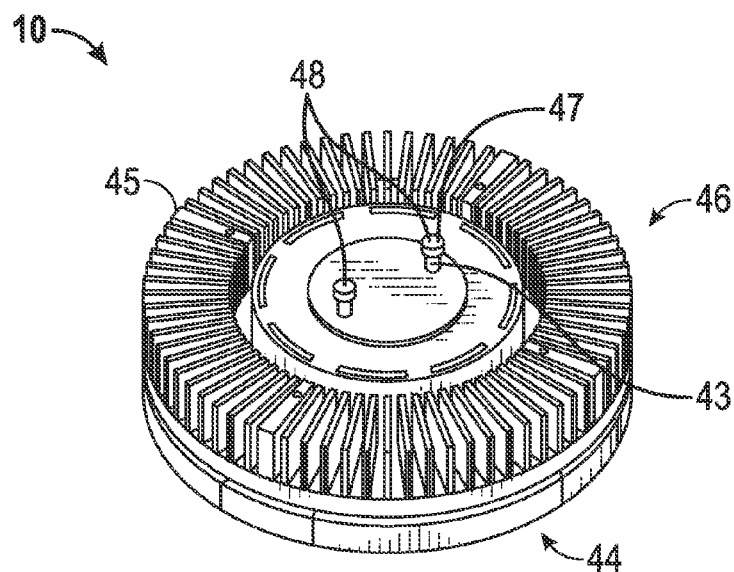
FIG. 1F shows another perspective view of the light engine of FIG. 1A.

FIG. 1F shows another perspective view of the light engine of FIG. 1A. As illustrated, in some implementations, the back side 46 of the light engine 10 can include one or more electrical connection contacts 48. In some implementations, the contacts 48 can include two or more prongs, blades, or pins, extending longitudinally from the back side 46 of the light engine 10. These contacts 48 may provide electrical and/or mechanical connection between the light engine 10 and a fixture configured to retain the light engine 10. As will be discussed further below, electrical and/or mechanical connection between the light engine 10 and a fixture can be provided using a screw-like connector. Also, in some implementations for enabling very shallow/low profile light fixtures or cans, for example between ½ inch and ¼ inch, electrical connection contacts 48 can be along sides of the light engine 10 (for example, pins could extend radially outward from opposing points on the outer circumference of the circular light engine 10 illustrated in FIG. 1F).

Figure 1G:
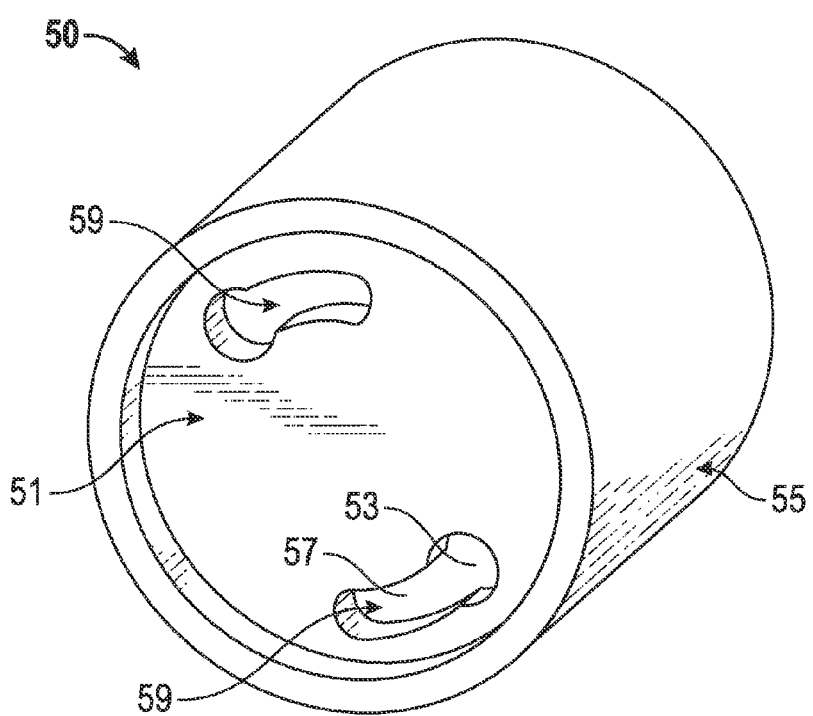
FIG. 1G shows a perspective view of a connector configured to retain the light engine of FIG. 1E.

FIG. 1G shows a perspective view of an example of a connector to which the light engine of the implementation of FIG. 1E is configured to be coupled. The connector 50 can engage the contacts of a light engine to provide electrical and/or mechanical connection with the light engine 10 (see FIG. 1E). In some implementations, the connector 50 is disposed within the interior of a light fixture. A retention region 51 of the connector 50 can include two or more terminals 59 configured to receive the contacts 48 of the light engine 10. In this way, the connector 50 can be at least electrically coupled to the light engine 10 via the engaging structure of the contacts 48 of the light engine 10 and the terminals 29 disposed within the retention surface 51 of the connector 50.

In one implementation, the connector 50 is a GU 24 socket and the light engine 10 includes a GU 24 base configured to be retained within the socket, although similar low-profile interconnection structures can also be used. In other implementations, other conventional interconnection structures, such as E26/27, can also be used, and custom or proprietary connectors can also be used. In some implementations, the connector 50 can include one or more wires or conductive traces (not shown) disposed within the connector 50 and providing an electrical path through the terminals 59 to provide power to the light engine 10.

As shown in FIG. 1F, each contact 48 of the light engine 10 can include a proximal portion 43 extending from the back side 46 of the light engine 10 and a distal portion 47 extending from the proximal portion 43. In some implementations, the distal portion 47 can be enlarged or flared relative to the proximal portion 43 such that the distal portion 47 has a minimum radial dimension that is greater than a maximum radial dimension of the proximal portion 43. As shown in FIG. 1G, each terminal 59 can include a slot having a first portion 53 and a second portion 57. The first portion 53 can be sized and shaped to receive the distal portion 47 of a contact 48. The second portion 57 can be sized and shaped to inhibit the longitudinal movement or withdrawal of a received contact 48 by abutting or otherwise engaging the distal portion 47 of the received contact 48. In this way, the terminals 59 and contacts 48 can engage one another to releasably or temporarily connect the connector 50 relative to the light engine 10.

Implementations of light engines discussed herein allow the use of low profile light fixtures or cans which are substantially smaller in height than conventional light fixtures. Light fixtures or cans having depths of less than three inches, less than two inches, or less than one inch, or less than ½ inch, or between ½ inch and ¼ of an inch may be used. Light engines having a width (or diameter) of greater than three inches, greater than four inches, greater than five inches, or greater than six inches may be used. In some implementations, the maximum width of the light guiding plate of the light engine is less than or equal to 5 inches, less than or equal to 4 inches, or less than or equal to 2 inches. Commercial lighting fixtures or cans with standard diameters or widths include generally cylindrical cans with diameters of 2 inches, 4 inches, 6 inches, 8 inches, and 10 inches, 12 inch by 12 inch and 24 inch by 24 inch square fixtures, and 24" by 48" rectangular fixtures (although other sizes and shapes of cans and fixtures both within and outside of this range may also be available). In particular, when a light guide such as the tapered light guide discussed above is used, the height to width ratio of the light fixture may be made significantly smaller than conventional light fixtures. For example, in some implementations, the minimum height to width ratio of a light fixture may be less than or equal to 1:2, 1:3, 1:4, 1:6, 1:8, 1:10, 1:12, 1:16, 1:20, 1:24, and 1:48. It will be understood, however, that dimensions and ratios larger or smaller than the above ranges may also be used.

For example, an MR16 class can with a two inch diameter and a height of one inch will have a height to width ratio of 1:2, and a similar can with a ½ inch height will have a height to width ratio of 1:4. A 24 inch square fixture will have a minimum height to width ratio of 1:24 for a fixture one inch in height and 1:48 for a fixture ½ inch in height. A rectangular fixture with the shorter side having a length of 24 inches will have identical minimum height to width ratios for the same fixture heights, although the maximum height to width ratio will be larger, depending on the additional length of the longer side. For convenience, the minimum height to width ratio for fixtures which are not radially symmetric can provide an indication of the relative thinness of the device, and the use of light engines and fixtures as discussed in greater detail herein can provide fixtures with a larger minimum height to width ratio than conventional lighting fixtures. In particular, by providing connection systems which can provide mechanical, electrical, and thermal connections via a single design, sufficient thermal management can be provided even in very low profile light fixtures. By providing both convective and conductive heat transfer components in a single light engine, installation within both a conventionally-dimensioned light fixture and a low profile light fixture can be made possible.

Figure 2A:
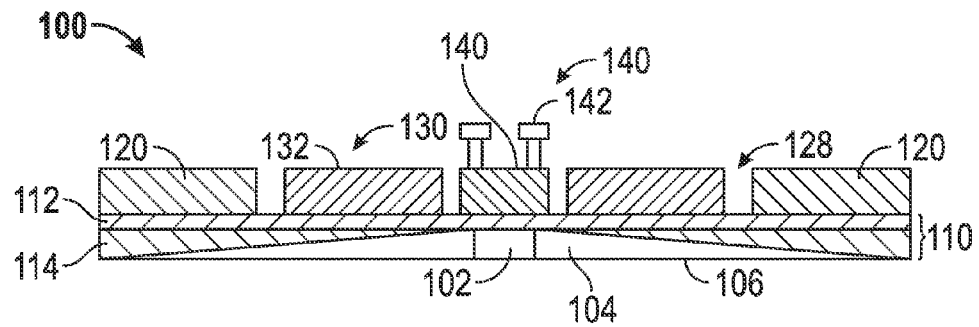
FIG. 2A is a cross-section view of a light engine including components configured to facilitate both convective and conductive heat transfer.
Figure 2B:
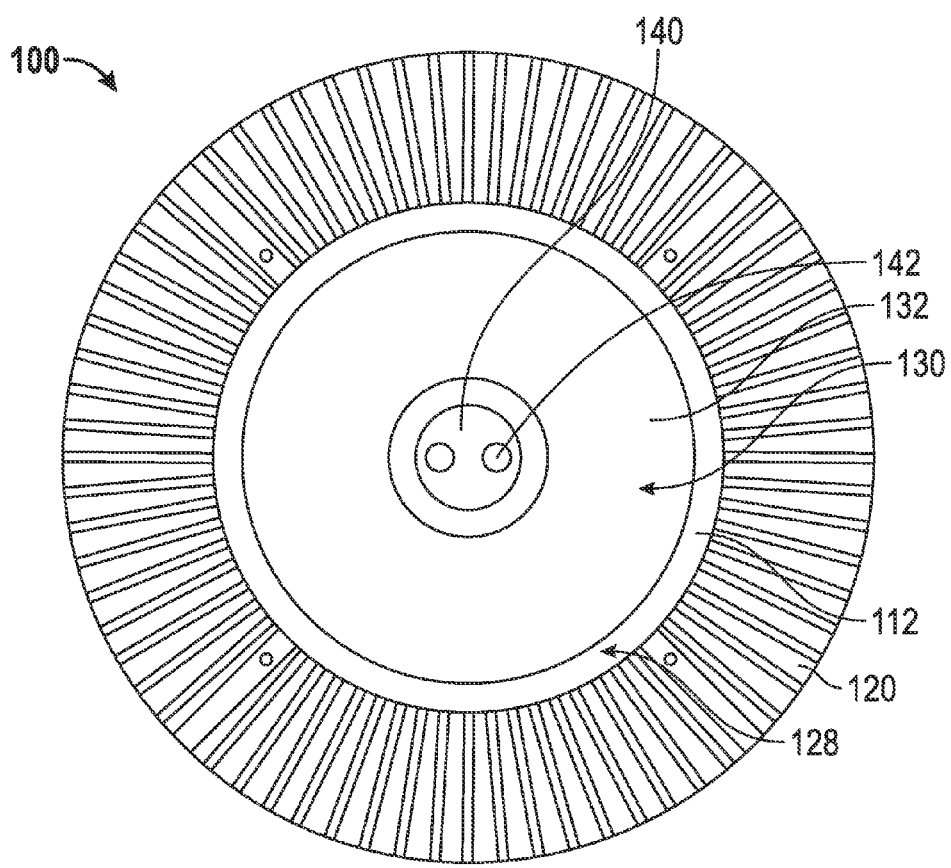
FIG. 2B is a top plan view of the light engine of FIG. 2A.
Figure 2C:
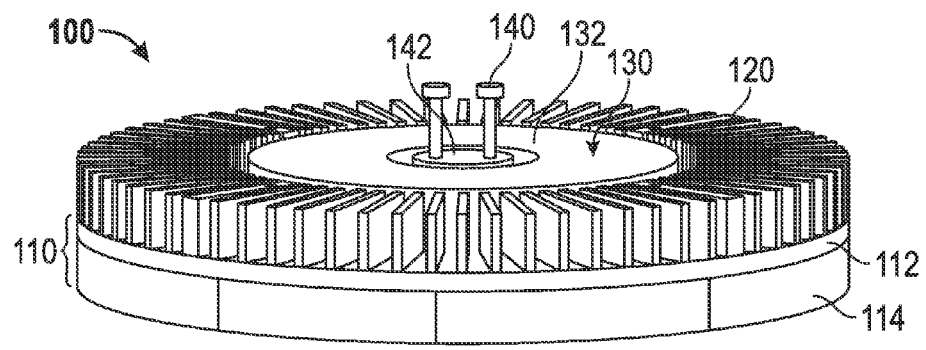
FIG. 2C is a perspective view of the light engine of FIG. 2A.

FIG. 2A is a cross-section view of a light engine including components configured to facilitate both convective and conductive heat transfer. FIG. 2B is a top plan view of the light engine of FIG. 2A. FIG. 2C is a perspective view of the light engine of FIG. 2A. The light engine 100 is schematically depicted as including a light source 102 such as an LED and associated optics configured to direct light into the adjoining tapered light guide 104. These associated optics may include, for example, a radially symmetric reflector such as the radially symmetric reflector 23 of FIG. 1C, or any other suitable optical structure which directs light into an input surface of the tapered light guide.

As discussed above, the tapered light guide 104 can be configured to direct light out of an output surface 106 of the tapered light guide 104 at a constrained range of angles. The light output may in some implementations be acted upon by light shaping optics (not shown) disposed adjacent the output surface 106 of the tapered light guide 104, such as the light-turning film 13 of FIG. 1C, or other suitable light shaping optics.

The light source 102 can be a high-output LED light source, which will generate a substantial amount of heat energy. As discussed above, a convective heat path may be provided for thermal management, where heat generated from the light source 102 is conducted through a thermally conductive portion 112 of the body 110 of the light engine and to thermal fins 120 disposed around the periphery of the light engine. Although such a heat path may be referred to herein as convective, it will be understood that a heat path which terminates in a convective heat transfer component may include conductive heat transfer at locations along the heat path prior to the convective end of the heat path. In some implementations, a heat path referred to herein as a convective heat path will include conductive heat transfer along substantially the entire heat path before terminating in a convective heat transfer component. The thermally conductive portion 112 of the body 110 and the thermal fins 120 in contact with the thermally conductive portion 112 of the body 110 thus serve as a convective heat sink, in which convective heat transfer occurs between the thermal fins 120 and air passing upwards over the thermal fins 120. The thermal fins 120 thus provide means for facilitating convective heat transfer from the light engine 100 to the surroundings.

In other implementations, alternate convective heat transfer components can be used in addition to or in place of thermal fins. For example, pins or rods may also be used instead of or in conjunction with fins. Convective heat transfer components may include channels within the structure to augment heat transfer components such as thermal fins 120, by facilitating air flow across the light engine and/or by increasing the surface area exposed to the airflow.

Active convective heat transfer components may also be incorporated into the light engine. For example, at least one fan or similar structure may be included the light engine, or piezoelectric structures that flex to cause a flapping motion, in order to increase airflow across or over the light engine. Heat pipes including a thermally conductive fluid may also be used, and active routing of the fluid within the heat pipes via a pump or similar component may be used.

In some implementations, the entire body 110 may include a thermally conductive material, but in other implementations, part of the body 110 may include a thermally insulating portion 114. This thermally insulating portion 114, may, for example, serve as a buffer between the thermally conductive body portion 112 and portions of the light guide 104 to minimize exposure of the light guide 104 to heat. In some implementations, the thermally conductive portion 112 of the body 110 may be radially symmetric and extend to or near the outer edge of the light engine 100 as illustrated, although other shapes and sizes are also possible.

When there is a substantial amount of clearance above and/or to the sides of the light engine 100, as may be the case in implementations in which the light engine 100 is retained within a conventionally-dimensioned light fixture, the efficiency of the convective heat transfer components is improved. However, when the light engine 100 is installed within a fixture having dimensions similar to that of the light engine 100, the airflow around the light engine 100 is constrained, reducing the efficiency of the convective heat transfer components.

To facilitate an alternate heat transfer path, the light engine 100 also includes a highly thermally conductive transfer surface 132 which is configured to abut or be in thermal contact with a complementary portion of a low-profile light fixture. In the illustrated implementation, as can be best seen in FIGS. 2B and 2C, the thermally conductive transfer surface 132 is an annular upper surface of a thermal pad 130. The annular thermal pad 130 is disposed radially inward of thermal fans 120 and radially outward of the upwardly extending flared contacts 142 of a connector portion 140 of the light engine 100. As discussed above, the contacts 142 may provide at least electrical and mechanical connection with a light fixture, and may also facilitate thermal connection as well.

As will be discussed in greater detail below, the size, shape, and relative position of the transfer surface 132 relative to contacts 142 or thermal fins 120 may vary significantly in various implementations. In the illustrated implementation, however, the placement of the thermal fins 120 radially outward of the transfer surface 132 facilitates airflow over the thermal fins 120 because the air can be drawn upwards along the side of the light engine 100, rather than being drawn initially laterally along the rear surface of the light engine 100 before passing upwards past the thermal fins 120. Similarly, in the illustrated implementation, there is a gap 128 between the thermal pad 130 and the heat transfer fins 120 to minimize the effect of the thermal pad 130 on airflow past the thermal fins 120. However, in other implementations, the thermal pad 130 or an underlying portion of the light engine 100 may directly abut at least some of the thermal fins 120.

The thermal pad 130 may be formed from any sufficiently thermally conductive material. In some implementations, the transfer surface 132 of the thermal pad 130 may be shaped to abut a facing surface of the light fixture to ensure a large heat-transfer contact area. In the illustrated implementation, the transfer surface 132 is generally planar, but in other implementations, the transfer surface 132 and the corresponding facing surface may be at least partially non-planar and generally complementary. In some implementations, contact between large portions of the transfer surface 132 and the fixture surface may be facilitated by forming either the thermal pad 130 or an underlying portion of the light engine 100 from a material which is at least somewhat deformable. If the thermal pad 130 is mechanically biased against an interior surface of the fixture, the resultant deformation of the thermal pad 130 may bring more of the transfer surface 132 into contact with the light fixture. The thermal pad 130 and the transfer surface 132 thus provide means for facilitating conductive heat transfer from the light engine 100 to a surrounding fixture.

Thus, the light engine 100 includes both convective heat transfer components in the form of thermal fins 120 and a conductive heat transfer component in the form of thermal pad 130. A thermally conductive portion 112 of the body 110 of the light engine 100 forms a component of a conductive heat transfer path from the light source 102 through the thermal pad 130 to a fixture, and also forms a component of a convective heat transfer path from the light source 102 through the thermal fins 120 to air drawn past the thermal fins 120. As discussed above, the light source 102 may in come implementations include one or more LEDs disposed on or supported by a thermally conductive substrate and/or chuck (not specifically illustrated), which form a part of the heat path between the light source 102 and the conductive and convective heat transfer components. In particular, the thermally conductive portion 112 of the body 110 may abut the thermally conductive substrate and/or chuck, or the two may be in thermal contact using a thermally conductive paste, pad, or other material.

Figure 3A:
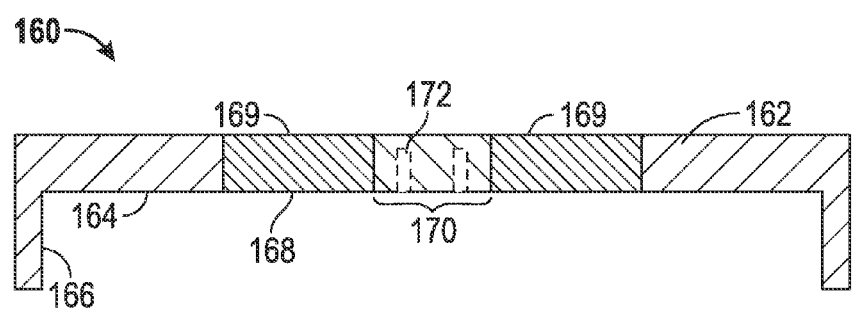
FIG. 3A is a cross-section view of a low-profile light fixture configured to retain the light engine of FIG. 2A.

FIG. 3A is a cross-section view of a low-profile light fixture configured to retain the light engine of FIG. 2A. The light fixture 160 includes a housing 162 which defines an upper interior surface 164 and at least one sidewall 166. A connector portion 170 of the light fixture 160 includes a pair of terminals 172 configured to receive and retain the flared contacts 142 extending from the connector portion 140 of light engine 100 (see FIGS. 2A-2C). As discussed with respect to the terminals 59 of FIG. 1G, the terminals 172 may include a slot having a first wider portion and a second narrower portion, such that a flared contact 142 of the light engine 100 can be inserted in a transverse direction into the wider first portion of the slot and twisted to translate the flared contact 142 along the slot and into the narrower portion of the terminal 172 where the flared contact 142 is inhibited from moving transversely out of the slot.

In the illustrated implementation, at least portions of the housing 162 of the fixture 160 located radially outward of the connector portion 170 of the fixture 160 include a highly thermally conductive material, forming one or more transfer surfaces 168 which can be brought into contact with a transfer surface of a low-profile light engine to form a portion of a conductive thermal path from the light engine.

In the illustrated implementation, the transfer surface 168 includes an annular section 169 of highly thermally conductive material within the housing 162 of light fixture 160, while the surrounding portions of the housing 162 include a material which is less thermally conductive. In other implementations, however, more or less of the housing 162 may include a highly thermally conductive material.

For example, in some implementations, the transfer surface 168 of the housing may not be an annular section 169 of highly thermally conductive material, but may instead be, for example, one or more arc-shaped sections, with one or more bands of less thermally conductive material extending between the sections. In other implementations, most or the entire upper interior surface 164 of the light fixture 160 may include a highly thermally conductive material, or the entire housing may be formed from a thermally conductive material, such as a metal. In some implementations, the highly thermally conductive portion of the light fixture 160 is larger than a transfer surface on a light engine brought into contact with the transfer surface 168. In such an implementation, the heat dissipation throughout the thermally-conductive portions of the light fixture 160 extending beyond the area of contact with the transfer surface on the light engine can be modified to some extent through the thickness and material selection of the thermally-conductive portions.

Although not illustrated herein, a light fixture may include additional conductive or convective thermal transfer components configured to extend the heat transfer path between the light fixture and an additional component or the ambient. For example, thermal fins, pins, or rods may be disposed on an exterior surface of the light fixture to facilitate convective heat dissipation into a plenum space. In other implementations, a heat transfer conduit of highly thermally conductive material may allow conductive heat transfer between the light fixture and an HVAC system or other location where conductive and/or convective heat transfer can be used to distribute the generated heat. In some implementations, these heat transfer conduits may be heat pipes which include a thermally conductive fluid.

In some implementations, the light fixture may include apertures (not shown) extending through the upper surface of the housing to allow substantial convective heat transfer from thermal fins, pins, rods or other convective heat transfer components on an installed light engine. For such a perforated fixture, convective cooling can be a significant mode of heat transfer even when the light fixture is a low-profile light fixture without substantial clearance between the upper interior surface of the fixture and the convective heat transfer components of the light engine. Such a perforated fixture may be used, for example, when the fixture is to be installed within a false ceiling or soffit with an open space above the light fixture, allowing some convective cooling directly from the installed light engine into the overlying plenum space.

A wide variety of other suitable additional components may be incorporated into or placed in thermal communication with the light fixture 160, including but not limited to heat exchangers, liquid or air cooling, or any other component configured to facilitate further heat transfer or otherwise extend a heat transfer path away from a light engine retained within the light fixture 160.

Figure 3B:
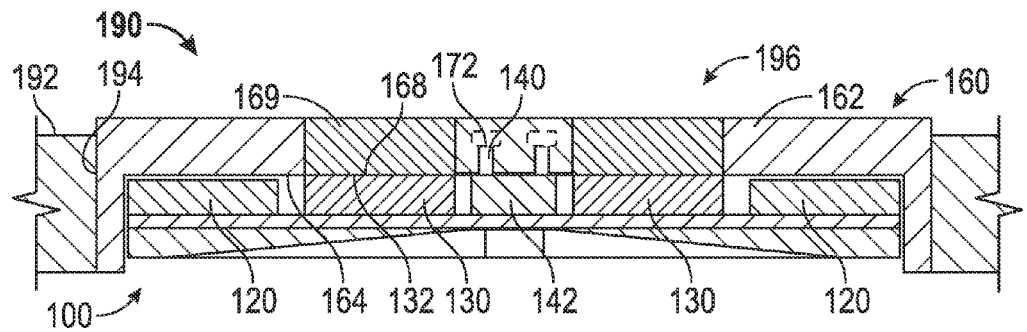
FIG. 3B is a cross-section view of an assembly in which the light engine of FIG. 2A is installed within the light fixture of FIG. 3A.

FIG. 3B is a cross-section view of an assembly in which the light engine of FIG. 2A is installed within the light fixture of FIG. 3A. The assembly 190 includes the light fixture 160 of FIG. 3A, and the light engine 100 of FIGS. 2A-2C retained therein. The light fixture 160 has been installed within an aperture 194 in a ceiling tile or soffit 192, such that an open area 196 is provided over the upper surface of the housing 160.

As discussed above, the flared contacts 142 of the connection portion 140 of the light engine 100 have been inserted into the wider first portions of the terminals 172, and rotated to translate the flared contacts 142 along the slot and into the narrower second portions of the terminals 172 to retain the flared contacts therein.

In one implementation, the thermal pad 130 of the light engine 100 may be at least slightly deformable, and may be compressed against the upper surface 164 of the light fixture 160 during insertion of the light engine 100 into the light fixture 160. After installation, the compressed thermal pad 130 may remain in a compressed state due to the retention of the flared contacts 142 within the terminals 172.

In other implementations, the thermal pad 130 need not be deformable. As an alternative to or in addition to the use of a deformable material for the thermal pad 130, the interaction between the flared contacts 142 and the terminals 172 in the light fixture 172 may bias the thermal pad 130 against the interior surface of the light fixture. This biasing may increase the amount of surface area in contact and improve the thermal connectivity between the transfer surface 134 of the light engine 100 and the transfer surface 168 of the light fixture 160.

Although the thermal fins 120 in FIG. 3B are illustrated as being spaced slightly apart from the interior surface of the light fixture 160, in other implementations the thermal fins or other convective heat transfer components (such as pins or rods) may contact an interior surface of the light fixture when the light engine 100 is installed, and may provide supplemental conductive heat transfer paths to the fixture 160. In some further implementations, the convective heat transfer components themselves may provide sufficient conductive heat transfer without the need for a separate thermal pad. These conductive heat transfer paths may be through an upper edge of the convective heat transfer components, an outer edge of the convective heat transfer components, or both.

In one implementation, the lower surface of the terminals 172 on one or both sides of the slot may angle upward and away from the interior surface 164 of the light fixture 160 as it moves away from the wider first portion towards the narrower second portion. Such an angled slot will pull the light engine 100 upwards as the light engine 100 is rotated to move the flared contacts 142 along the slots of terminals 172. In an alternate implementation, the lower surface of the terminal may be biased via a spring or similar biasing structure to press upwards and away from the interior surface 164 of the light fixture 160. For example, a lower surface of the terminals 172 may be fixed at the portion of the terminal 172 adjacent the wide first portion, and biased upwards using a spring or resilient hinge to rotate around the fixed end. Upon insertion of the flared contacts 142 into the terminals 172 and rotation of the light engine 100, the biasing force (which may be overcome by an installer during installation) will push the flared contacts 142 upwards, pulling the light engine 100 against the interior surface 164 of the light fixture 160, and maximizing the contact area between the transfer surface 134 of the light engine 100 and the transfer surface 168 of the light fixture 160.

Figure 4:
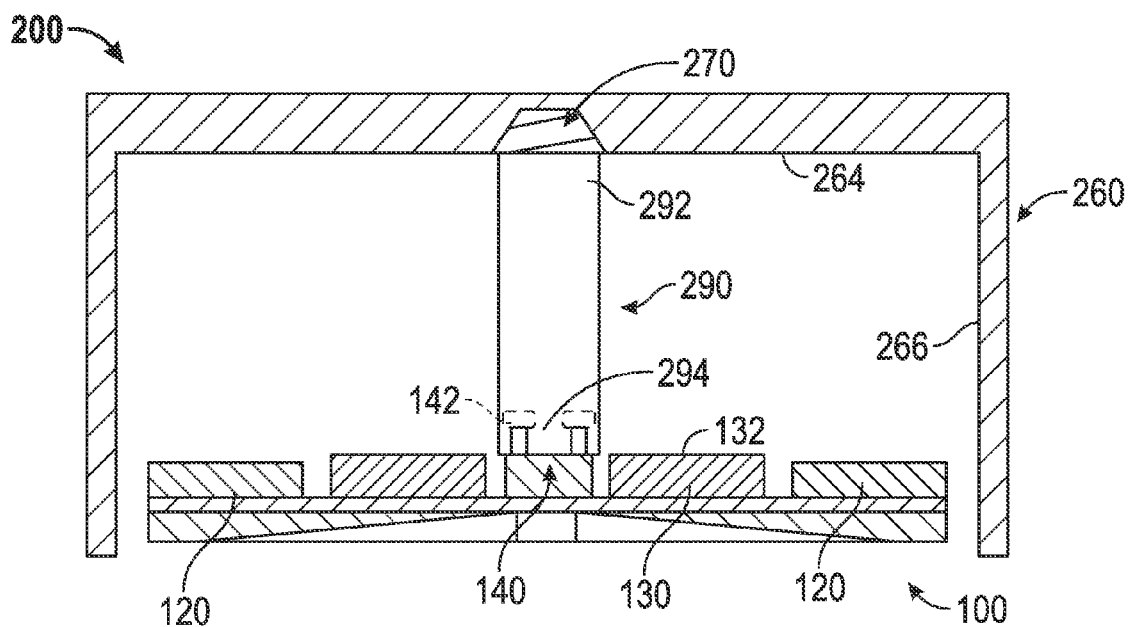
FIG. 4 is a cross-section view of an assembly in which the light engine of FIG. 2A is installed within a conventionally-dimensioned light fixture.

FIG. 4 is a cross-section view of an assembly in which the light engine of FIG. 2A is installed within a conventionally-dimensioned light fixture. In the illustrated implementation, the light engine 100 is positioned near the open end of the conventionally-dimensioned light fixture 260. As illustrated, spacing between the upper interior surface 264 of the light fixture and the upper portion of the light engine 100 is maintained by a transversely-extending extension portion 290, which in the illustrated implementation includes connection portions 292 and 294 at each end, providing both mechanical and electrical connection with the fixture 290. Such an extension portion 290 may also serve as an adapter to allow connection of a light engine having a first type of connector within a conventional socket having a second type of connector. The upper connection portion 292 is configured to engage with a connection portion 270 of the light fixture 260, which may be, for example, a conventional Edison light socket. The lower connection portion 294 is configured to engage with a connection portion 140 of the light engine 100, which as discussed above may include a pair of flared contacts 142. In other implementations, the extension portion 290 may be integrated into one of the light engine 100 or the light fixture 260.

In the assembly 200 of FIG. 4, the primary mode of thermal conduction away from the light engine may be convective cooling using the thermal fins 120, while the thermal conduction through transfer surface 132 of thermal pad 130 may be minimal. Similar modes of conduction would occur if the light engine were not installed within a fixture, but were instead installed into a socket or other connector without a surrounding housing. Thus, the light engine 100 includes components which provide alternate thermal conductive paths, the efficiency of each of which will depend on the dimensions of the light fixture in which the light engine 100 is currently installed.

Figure 5A:
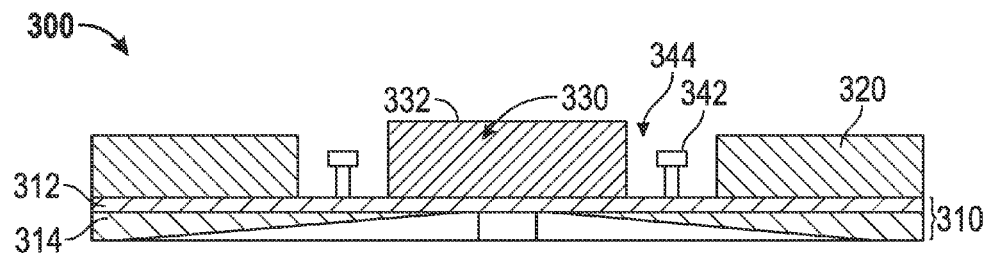
FIG. 5A is a cross-section view of an alternate implementation of a light engine including components configured to facilitate both convective and conductive heat transfer.
Figure 5B:
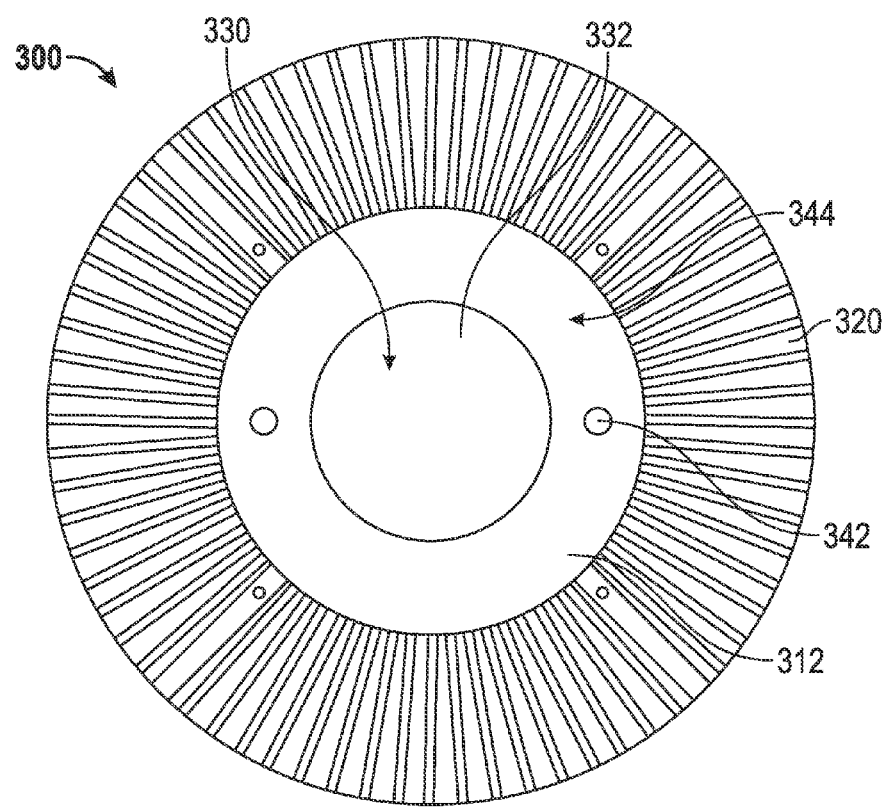
FIG. 5B is a top plan view of the light engine of FIG. 5A.
Figure 5C:
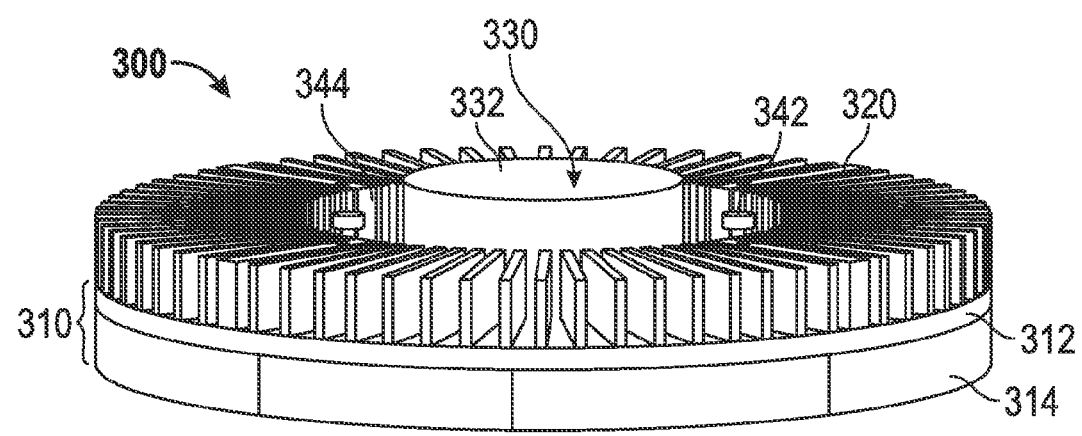
FIG. 5C is a perspective view of the light engine of FIG. 5A.

FIG. 5A is a cross-section view of an alternate implementation of a light engine including components configured to facilitate both convective and conductive heat transfer. FIG. 5B is a top plan view of the light engine of FIG. 5A. FIG. 5C is a perspective view of the light engine of FIG. 5A. Like the light engine 100 of FIGS. 2A-2C, the light engine 300 includes thermal fins 320, a thermal pad 330 having a transfer surface 332, and flared contacts 342. A thermally conductive portion 312 of the light engine body 310 similarly provides thermally conductive paths to both the thermal fins 320 and the thermal pad 310, and a thermally insulating portion 314 may underlie the thermally conductive portion 312. In the implementation of FIG. 5A-5C, however, the flared contacts 342 of light engine 300 are positioned radially outward of at least a portion of thermal pad 330, and radially inward of at least a portion of thermal fins 320. The recessed area or areas 344 surrounding the flared contacts 342 will facilitate connection of the flared contacts with a light fixture, as discussed in greater detail below.

In some implementations, the recessed area 344 surrounding the flared contacts is an annular channel between the thermal fins 320 and the thermal pad 330, but in other implementations, the thermal fins 320 in the areas away from the flared contacts may be longer, and extend further radially inward, defining smaller recessed areas 344 around each individual flared contact. In addition, although these areas are referred to as "recessed" for convenience, the underlying surface of the body 310 of the light engine 300 may in some implementations be generally planar from the edge of the thermal pad 330 to the edge of the light engine 310, and need not include an actual depression. Rather, the thermal fins 320 extending upward at a location radially outward of the light engine 300 will form a recess-like structure in the overall shape of the upper surface of the light engine 300.

This positioning of the flared contacts 342 allows the thermal pad 330 to be centrally located, rather than have an annular shape around a central connection portion. In addition, the thermal pad 330 may be disposed directly over the light source 302, which may further facilitate thermal conduction from the light source 302 by shortening the conduction path to the housing.

In addition, in the illustrated implementation, the uppermost portions of the flared contacts 342 do not extend beyond the transfer surface 332 of the thermal pad 330. These recessed flared contacts 342 allow electrical and mechanical connections to be made without increasing the overall height of the light engine 300 or the necessary corresponding depth of a light fixture configured to retain the light engine 300. Because of the inclusion of the conductive heat path through the transfer surface 332 of thermal pad 330, sufficient thermal management may be provided even in a very low-profile light fixture configured to retain the light engine 300. The use of recessed contacts such as flared contacts 342 is not dependent on the positioning of the contacts radially outward of the thermal pad 330, and recessed contacts may be used, for example, in an implementation such as that of FIGS. 3A-3B.

Figure 6A:
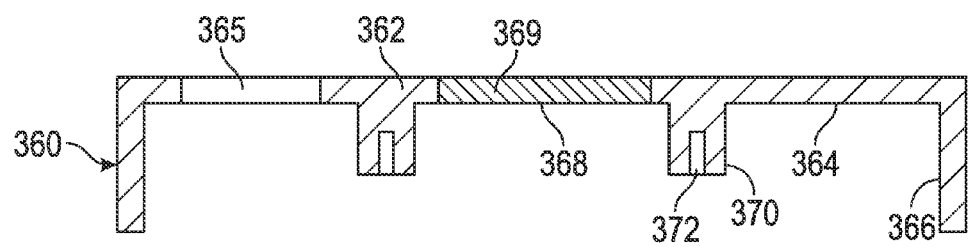
FIG. 6A is a cross-section view of a low-profile light fixture configured to retain the light engine of FIG. 5A.
Figure 6B:
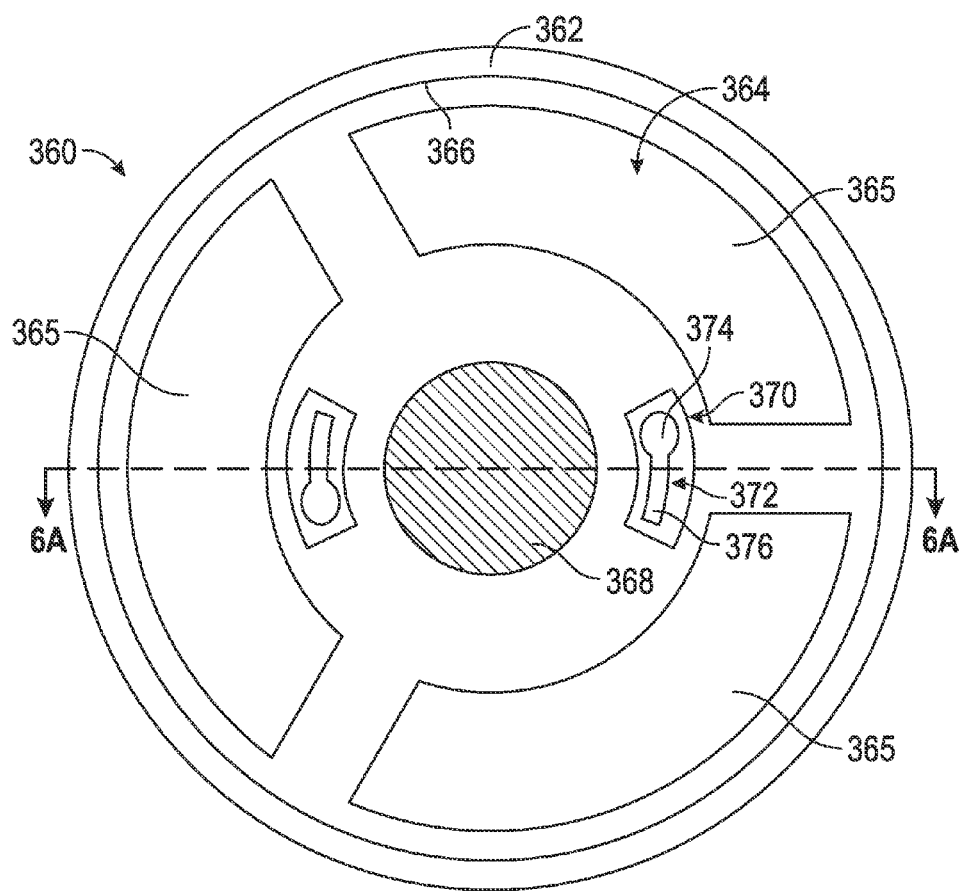
FIG. 6B is a bottom plan view of the light fixture of FIG. 6A.

FIG. 6A is a cross-section view of a low-profile light fixture configured to retain the light engine of FIG. 5A. FIG. 6B is a bottom plan view of the light fixture of FIG. 6A. The light fixture 360 includes a housing 362 which defines an upper interior surface 364 and at least one sidewall 366. In contrast to the light fixture 160 of FIG. 3A, however, the light fixture 360 includes connector structures 370 extending transversely downward from the upper interior surface 364 of the light fixture 360. Terminals 372 are located in the lower surface 374 of the connector structures 370, and configured to receive flared contacts of a light engine such as light engine 300 of FIGS. 5A-5C. As discussed above, these terminals 372 include a first wider portion 376 configured to allow the wide upper portion of a flared contact to pass through, and a second narrower portion 378 extending away from the first wider portion and permitting translation of the narrower neck portion of a flared contact therethrough, so that the flared contact will be retained within the terminal.

In the illustrated implementation, the second narrower portions 378 extend in an arc in a clockwise direction to permit installation with a rotational motion of a light engine, but other orientations (such as counter-clockwise) or other shapes may also be used. For example, in some implementations the second narrower portions 378 may be linear, if the light engine to be installed does not have a circular cross-section, facilitating installation via linear translation of a light engine instead of rotational translation.

In the illustrated implementation, a portion 369 of the housing 360 located between the connector structures 370 provides a transfer surface 368. As discussed above, the transfer surface 368 may be a lower portion of a highly thermally conductive portion of the housing 360, but the portions of the housing 360 formed from a highly thermally conductive material may in some implementations be either larger or smaller than the transfer surface 368.

In addition to the transfer surface 368, the housing 360 includes a plurality of apertures 365 extending therethrough. As discussed above, these apertures 365 can overlie conductive heat transfer components such as thermal fins 320 of an installed light engine (see FIG. 6C) to allow air flow for convective heat transfer from the thermal fins even when the light fixture is a low-profile light fixture. In the illustrated implementation, these apertures 365 are three arc-shaped cut-outs located radially outward of connector structures 370, but other numbers, sizes, and shapes of such apertures may be used in other implementations.

Figure 6C:
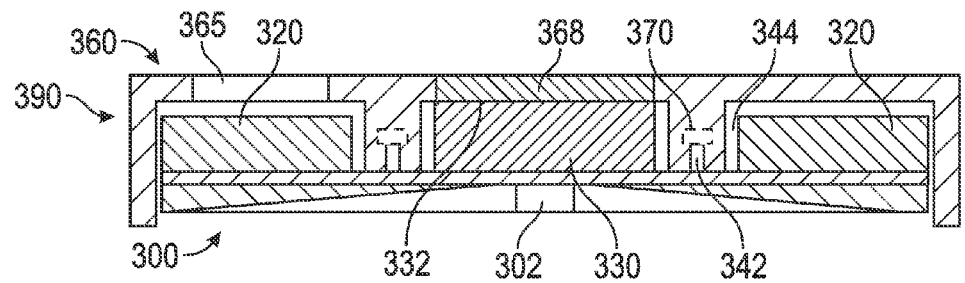
FIG. 6C is a cross-section view of an assembly in which the light engine of FIG. 5A is installed within the light fixture of FIG. 6A.

FIG. 6C is a cross-section view of an assembly in which the light engine of FIG. 5A is installed within the light fixture of FIG. 6A. It can be seen in FIG. 6C that the connection structures 370 of the light fixture 360 are dimensioned to pass into the recessed areas 344 of the light engine 300 to receive and retain the flared contacts 342 therein, forming an assembly 390. The transfer surface 332 of the thermal pad 330 of the light engine is brought into contact with the transfer surface 368 of the light fixture 360, forming a conductive thermal path from the light source 302 to the light fixture 360. This conductive path can then be extended further through the use of additional structures, as discussed above, or the heat may be convectively dissipated into the space overlying the light fixture through the apertures 365, or in alternate implementations, through the use of supplemental convective heat transfer components such as fins, rods, or pins on the exterior of the light fixture 360.

The light fixture assembly 390 of FIG. 6C can be made even thinner than the light fixture assembly 190 of FIG. 3B, due to the recessed positioning of the flared contacts 342 of the light engine 300. While the interior dimensions of the light fixture 160 of FIG. 3A can be identical to those of the light fixture 360 of FIG. 6A, at least part of the upper portion of the housing 162 of the light fixture 160 must be made sufficiently thick to accommodate the height of the flared contacts. The light fixture 360 does not require this additional thickness in the housing. As noted previously, to even further reduce the profile of the light fixture 360, electrical and/or mechanical connection may be achieved using flared contacts extending radially out from a side of the light engine 300. In such an implementation, terminals 370 may be formed on a sidewall 366 of the light fixture 360.

Figure 7:
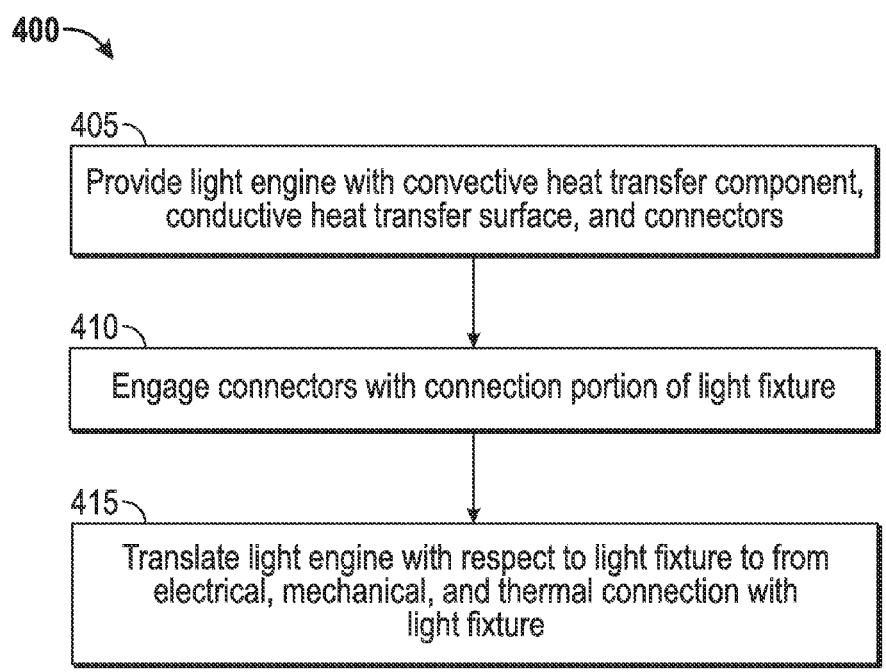
FIG. 7 is a block diagram showing an example of a method of installing a light engine within a low-profile light fixture.

FIG. 7 is a block diagram showing an example of a method of installing a light engine within a low-profile light fixture. The method 400 begins at a block 405 where a light engine is provided, including a convective heat transfer component configured to provide a convective thermal path away from the light engine, a conductive heat transfer surface, and a plurality of connectors.

The method 400 then moves to a block 410 where the plurality of connectors are engaged with a corresponding connection portion of a low-profile light fixture. As discussed above, this engagement may include insertion of flared contacts through a wider section of corresponding terminals in the light fixture, or a screw-type electrical and/or mechanical connection.

The method 400 then moves to a block 415 where the light engine is translated with respect to the light fixture to secure the light engine in place, and to provide mechanical, electrical and thermal connection between the light engine and the light fixture. The thermal connection may be provided by bringing a transfer surface of a thermal pad on the light engine into contact with a transfer surface of the interior surface of the light fixture. As discussed above, this translation may be rotational or linear.

Figure 8:
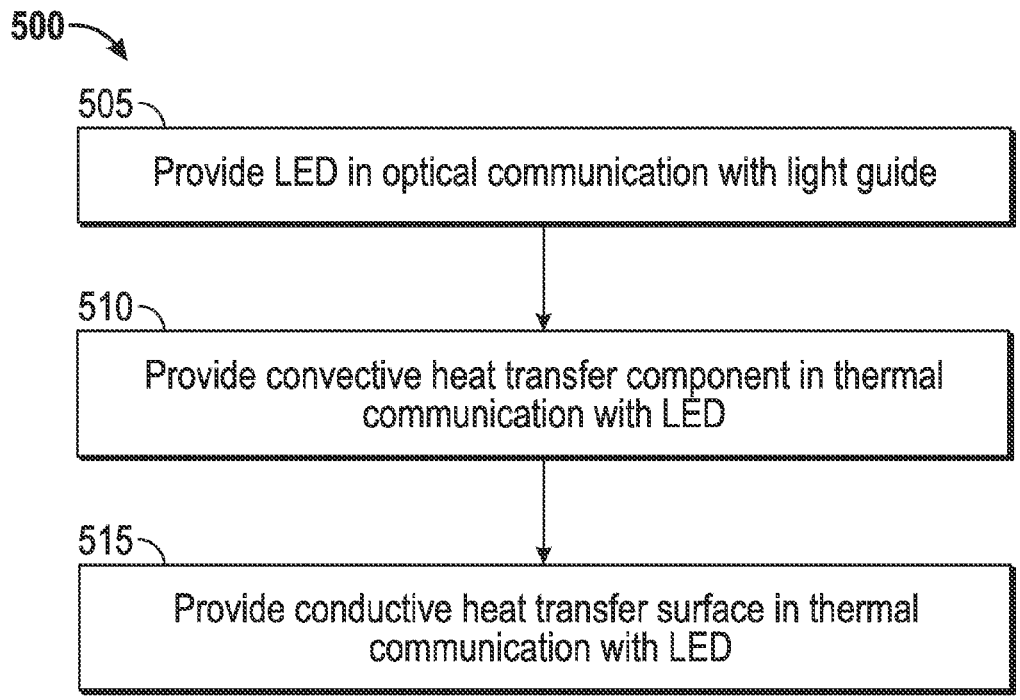
FIG. 8 is a block diagram showing an example of a method of fabricating a low-profile light engine including both convective and conductive heat transfer components.

FIG. 8 is a block diagram showing an example of a method of fabricating a low-profile light engine including both convective and conductive heat transfer components. The method 500 begins at a block 505 where an LED in optical communication with a light guide is provided. The light guide may be tapered as discussed above, and may be radially symmetric or any other suitable shape. Providing an LED may in some implementations comprise providing one or more LEDs disposed on a thermally conductive substrate or chuck. In some implementations, the LED and light guide may be assembled together at this point, while in other implementations the LED and light guide may be previously assembled.

The method 500 then moves to a block 510 where a convective heat transfer component is provided in thermal communication with the LED. As discussed herein, in some implementations, the convective heat transfer component may include a plurality of outwardly extending thermal fins, pins, and/or rods. In some implementations, the convective heat transfer component may include an active component such as a fan or flexible piezoelectric structure. Thermal communication between the convective heat transfer component and the LED may be provided through the use of a thermally conductive body portion in thermal communication with the LED and the convective heat transfer component.

The method 500 then moves to a block 515 where a conductive heat transfer surface is provided in thermal communication with the LED. As discussed herein, this transfer surface is configured to provide a conductive heat path away from the LED when the light engine is installed within a light fixture by abutting a thermally conductive portion of the light fixture. The same thermally conductive body portion used to provide thermal communication between the LED and the convective heat transfer component may be used to provide thermal communication between the LED and the transfer surface. The transfer surface may include an outer surface of a thermal pad, which may in some implementations be formed from a material which is at least slightly deformable, such that the transfer surface can be mechanically biased against the light fixture to improve the thermal connection therebetween.

Figure 9:
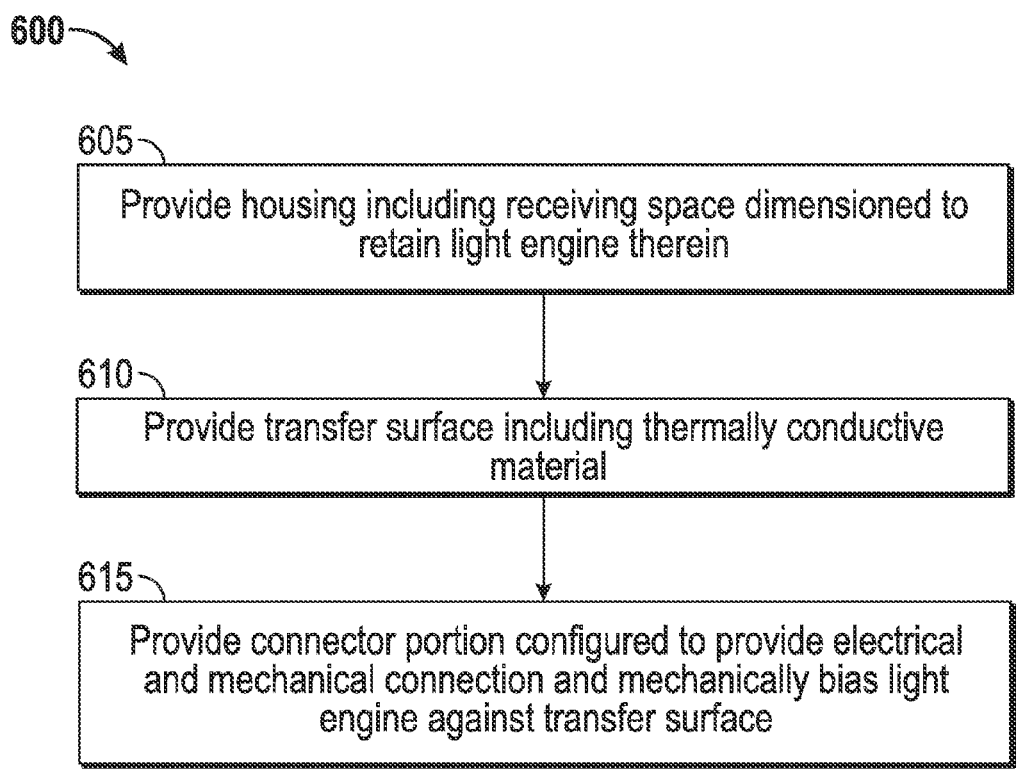
FIG. 9 is a block diagram showing an example of a method of fabricating a low-profile light engine including both convective and conductive heat transfer components.

FIG. 9 is a block diagram showing an example of a method of fabricating a low-profile light fixture. The method 600 begins at a block 605 where a housing is provided. The housing defines a receiving space dimensioned to retain a low-profile light engine therein, and may include, for example, an upper interior surface and one or more interior sidewalls, as discussed above.

The method 600 then moves to a block 610 where a transfer surface is provided, including a thermally conductive material. The transfer surface is configured to abut a portion of a retained light engine, and is therefore exposed to the receiving space in which the light engine is to be retained. In some implementations, the transfer surface may be a surface of a thermally conductive portion of the housing formed integrally with the remainder of the housing, and blocks 605 and 610 may be performed by providing such a housing.

The method 600 then moves to a block 615 where a connector portion configured to provide electrical and mechanical connection with the light engine is provided. The connector portion is configured to mechanically bias a portion or the light engine against the transfer surface to provide a conductive heat path from the light engine to the transfer surface, as discussed herein. The connector portion may include a lower surface which is angled or biased at one end to increase this mechanical biasing as a connector of the light engine is translated or rotated along the connector portion.

A wide variety of alternative structures for light engines and light fixtures may be provided. For example, in some implementations, a thermal pad may be disposed on an interior surface of a light fixture, rather than on a light engine, and the light engine may include only a transfer surface on a body of the light engine. In other implementations, thermal pads may be disposed on both the light engine and an interior surface of the light fixture. In some implementations, the transfer surfaces may be located on the side of the light engine or the sidewall of the light fixture, rather than on the upper surfaces as depicted herein. In particular, in implementations in which the light engine is configured to be installed using a linear motion rather than a rotation motion, the linear movement may bring a transfer surface on a side of the light engine into contact with a transfer surface on a sidewall of a light fixture, forming a conductive thermal path therebetween.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the light fixture or light engine as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations. Additionally, other implementations are within the scope of the following claims. In some cases, the actions recited in the claims can be performed in a different order and still achieve desirable results.

What is claimed is:

1. A light engine, comprising:
   a light-emitting diode (LED);
   a light guide in optical communication with the LED and having an output surface, wherein the light guide is configured to direct light from the LED through the output surface;
   a convective heat transfer component configured to provide a convective thermal path away from the LED;
   a transfer surface configured to provide a conductive heat path away from the LED when the light engine is installed within a light fixture such that the transfer surface is configured to abut a portion of the light fixture; and
   one or more contacts extending from a surface of the light engine, the contacts configured to provide electrical and mechanical connection with a light fixture.

2. The light engine of claim 1, wherein the light engine additionally includes a thermal pad, wherein the transfer surface is a surface of the thermal pad.

3. The light engine of claim 2, wherein the thermal pad includes a deformable material.

4. The light engine of claim 1, wherein the one or more contacts are disposed radially outward of at least a portion of the transfer surface.

5. The light engine of claim 1, wherein an upper portion of the one or more contacts does not extend beyond an upper portion of the transfer surface.

6. The light engine of claim 1, wherein the one or more contacts are disposed radially inward of at least a portion of the transfer surface.

7. The light engine of claim 6, wherein the transfer surface includes an annular surface.

8. The light engine of claim 1, wherein the convective heat transfer component includes a plurality of thermal fins, rods, and/or pins disposed radially outward of at least a portion of the transfer surface.

9. The light engine of claim 1, wherein the convective heat transfer component includes a movable component configured to increase airflow adjacent the light fixture.

10. The light engine of claim 9, wherein the movable component includes one of a fan or a piezoelectric element.

11. A light engine, comprising:
    a light guide in optical communication with a light-emitting diode (LED) and having an output surface, wherein the light guide is configured to direct light from the LED through the output surface;
    a convective heat transfer component configured to provide a convective thermal path away from the LED;
    a transfer surface configured to provide a conductive thermal path away from the LED; and
    a plurality of contacts which provide electrical and mechanical connection with a light fixture, wherein the contacts further enable a conductive thermal connection by securing the transfer surface of the light engine against a complimentary transfer surface of the light fixture when the light engine is installed within the light fixture.

12. The light engine of claim 11, wherein the transfer surface comprises a surface of a deformable thermal pad, wherein the contacts maintain the thermal pad in a partially deformed state when the transfer surface of the light engine is secured against the transfer surface of the light fixture.

13. The light engine of claim 11, wherein the contacts are disposed within a recessed portion of the light engine.

14. The light engine of claim 11, wherein an upper portion of the contacts do not extend beyond an upper portion of the transfer surface.

15. The light engine of claim 11, wherein the contacts are disposed radially outward of at least a portion of the transfer surface.

16. A light engine, comprising:
    a light guide in optical communication with a light-emitting diode (LED) and having an output surface, wherein the light guide is configured to direct light from the LED through the output surface;

a plurality of thermal fins disposed around a periphery of the light engine for providing a convective thermal path away from the LED; and means for providing a conductive thermal path away from the LED when the light engine is disposed within a light fixture such that the means for providing a conductive thermal path is configured to abut a portion of the light fixture.

17. A light engine, comprising:
a light guide in optical communication with a light-emitting diode (LED) and having an output surface, wherein the light guide is configured to direct light from the LED through the output surface;
a transfer surface configured to abut a complimentary transfer surface of the light fixture for providing a convective thermal path away from the LED; and
means for providing a conductive thermal path away from the LED when the light engine is disposed within a light fixture such that the means for providing a conductive thermal path is configured to abut a portion of the light fixture.

18. The light engine of claim 17, wherein the transfer surface comprises a surface of a thermal pad.

19. A method of installing a light engine into a light fixture, comprising:
providing an LED-based light engine, the light engine comprising:
a convective heat transfer component configured to provide a convective thermal path away from the light engine;
a transfer surface; and
a plurality of contacts extending from the light engine;
engaging the plurality of contacts with a corresponding connection portion of a light fixture; and
translating the light engine relative to the light fixture to form an electrical and mechanical connection with the light fixture, wherein translation of the light engine brings the transfer surface of the light engine into contact with a complementary transfer surface of the light fixture to form a thermal connection therebetween.

20. The method of claim 19, wherein translating the light engine relative to the light fixture includes rotating the light engine relative to the light fixture.

21. A light fixture, comprising:
a housing defining a receiving space dimensioned to retain a light engine therein;
a transfer surface including a thermally conductive material, wherein the transfer surface is exposed to the receiving space;
a connector portion configured to provide electrical and mechanical connection with the light engine, wherein the connector portion is configured to mechanically bias a portion of the light engine against the transfer surface to provide a conductive heat path from the light engine to the transfer surface.

22. The light fixture of claim 21, wherein the receiving space of the housing has a depth of less than two inches, and wherein a minimum height to width ratio of the light fixture is less than or equal to 1:2.

23. The light fixture of claim 21, wherein the receiving space of the housing has a depth of less than one inch, and wherein the minimum height to width ratio of the light fixture is less than or equal to 1:4.

24. The light fixture of claim 21, wherein the light fixture additionally comprises at least one convective heat transfer component disposed on an outer surface of the housing.

25. A method of fabricating a light engine, comprising:
providing a light-emitting diode (LED) in optical communication with a light guide;
providing a convective heat transfer component in thermal communication with the LED; and
providing a transfer surface in thermal communication with the LED and configured to provide a conductive heat path away from the LED when the light engine is installed within a light fixture such that the transfer surface is configured to abut a portion of the light fixture; and
providing at least one connector in electrical communication with the LED, wherein the connector is configured to provide mechanical and electrical connections between the LED and the light fixture.

26. The method of claim 25, wherein providing a convective heat transfer component in thermal communication with the LED comprises providing a plurality of thermal fins, pins, or rods extending outward from a surface of the light engine.

* * * * *